United States Patent [19]

Lyons et al.

[11] Patent Number: 5,407,993
[45] Date of Patent: Apr. 18, 1995

[54] POLYCHLOROPRENE BLEND COMPOSITION

[75] Inventors: Donald F. Lyons, Pewee Valley, Ky.; Jack L. Nyce, deceased, late of Newark; by Stephen C. Poole, executor, Wilmington, both of Del.

[73] Assignee: E. I. Du Pont de Nemours and Company, Wilmington, Del.

[21] Appl. No.: 163,388

[22] Filed: Dec. 8, 1993

[51] Int. Cl.6 .................... C09J 111/02; C09J 151/04; C08L 11/02; C08L 51/04
[52] U.S. Cl. .................................. 524/501; 525/215; 525/76
[58] Field of Search ................... 525/215, 76; 524/501

[56] References Cited

U.S. PATENT DOCUMENTS

| | | | |
|---|---|---|---|
| 3,079,365 | 2/1963 | Andersen et al. | |
| 3,655,827 | 4/1972 | Finlay et al. | |
| 3,728,316 | 4/1973 | Simons | 260/80.77 |
| 3,920,600 | 11/1975 | Ahramjian | 260/29.7 |
| 3,943,193 | 3/1976 | Miyagawa et al. | |
| 3,968,065 | 7/1976 | Morris et al. | |
| 4,366,289 | 12/1982 | Keskkula et al. | |
| 4,415,704 | 11/1983 | Weinstein | |
| 4,454,304 | 6/1984 | Tsai | |
| 5,026,779 | 6/1991 | Musch et al. | |
| 5,206,288 | 4/1993 | Gasiewski et al. | |
| 5,332,771 | 7/1994 | Christell | 524/270 |

FOREIGN PATENT DOCUMENTS 960468 6/1964 United Kingdom .

Primary Examiner—Carman J. Seccuro, Jr.
Attorney, Agent, or Firm—Marilyn H. Bromels

[57] ABSTRACT

Blends of chloroprene homopolymers or copolymers with chloroprene/acrylate or chloroprene/methacrylate graft copolymers provide compositions especially useful as components of latex adhesive formulations.

10 Claims, No Drawings

POLYCHLOROPRENE BLEND COMPOSITION

BACKGROUND OF THE INVENTION

This patent relates to novel blends of chloroprene polymers which are especially useful as components of latex adhesive formulations.

Polychloroprene solvent-based adhesives are well-known and widely available compositions which provide excellent adhesion to a variety of substrates. Adhesive bond strengths are high and the compositions themselves exhibit outstanding chemical resistance. However, in spite of the superior properties of the adhesives, use of these compositions has declined as a result of environmental and health concerns related to the presence of substantial quantities of volatile organic solvents in the adhesive formulations. It is therefore a goal of the adhesives industry to develop alterative polychloroprene compositions which exhibit physical properties equivalent to those of the solvent based adhesives, but wherein the amount of organic solvent is substantially reduced or completely eliminated.

A number of aqueous latex adhesive systems have been utilized as replacements for the solvent based systems, but, unfortunately, most of these alternative systems do not exhibit comparable performance properties. For example, it is common for contactability, long term bond strength, and adhesion to non-porous substrates to be adversely affected. This is particularly true for adhesives used to bond polyvinyl chloride to itself or to other substrates.

Polychloroprene latex adhesive systems and solvent-based adhesive systems generally contain a single chloroprene elastomer, either a polychloroprene homopolymer or a chloroprene copolymer. See, for example U.S. Pat. Nos. 3,728,316; 3,920,600 and co-pending U.S. patent application Ser. No. 07/986449, now U.S. Pat. No. 5,332,771. It has now been found that if certain chloroprene homopolymers or copolymers are blended with chloroprene/acrylate graft copolymers or chloroprene/methacrylate graft copolymers, latex adhesive compositions can be formulated which have excellent adhesion to polyvinyl chloride. That is, they exhibit rapid bond development and require low pressures to form a bond. In addition, the formulations are substantially free of organic solvent.

SUMMARY OF THE INVENTION

In particular, the present invention is directed to a polychloroprene composition which comprises a blend of a) a first chloroprene polymer which is (i) a polychloroprene homopolymer or (ii) a copolymer of chloroprene and at least one other comonomer selected from the group consisting of 2,3-dichloro-1,3-butadiene and monoethylenically unsaturated vinyl monomers containing from 3 to 10 carbon atoms, wherein at least 75 weight percent of the copolymerized units are chloroprene units, said first chloroprene polymer having been prepared by free radical emulsion polymerization to a conversion of at least 60% in the presence of a mercaptan, dialkylxanthogen disulfide, or dialkoxyxanthogen disulfide modifier; and is b) a second chloroprene polymer comprising 70–95 percent by weight copolymerized units of chloroprene and 5–30 percent by weight copolymerized units of at least one ester monomer selected from the group consisting of $C_1$–$C_{10}$ alkyl, hydroxyalkyl, or cycloalkyl esters of acrylic acid and $C_1$–$C_{10}$ alkyl, hydroxyalkyl, or cycloalkyl esters of methacrylic acid, wherein the total weight percentage of copolymerized units of chloroprene and copolymerized units of said ester monomer or monomers is at least 90%, said second chloroprene polymer having been prepared by free radical emulsion polymerization to a conversion of at least 90% in the presence of a mercaptan, dialkylxanthogen disulfide, or dialkoxyxanthogen disulfide modifier; and wherein the weight of the first chloroprene polymer is 25–95% of the total weight of the first and second chloroprene polymers.

A preferred embodiment of the present invention is a composition wherein the second chloroprene polymer is a graft copolymer prepared by polymerization at a temperature of 10–20° C. until a conversion of at least 70% is reached, followed by polymerization at a temperature of 45–55° C.

The invention is further directed to polychloroprene compositions especially adapted for use in formulating adhesives which comprise aqueous dispersions of a) a first chloroprene polymer which is (i) a polychloroprene homopolymer or (ii) a copolymer of chloroprene and at least one other comonomer selected from the group consisting of 2,3-dichloro-1,3-butadiene and monoethylenically unsaturated vinyl monomers containing from 3 to 10 carbon atoms, wherein at least 75 weight percent of the copolymerized units are chloroprene units, said first chloroprene polymer having been prepared by free radical emulsion polymerization to a conversion of at least 60% in the presence of a mercaptan, dialkylxanthogen disulfide, or dialkoxyxanthogen disulfide modifier; and b) a second chloroprene polymer comprising 70–95 percent by weight copolymerized units of chloroprene and 5–30 percent by weight copolymerized units of at least one ester monomer selected from the group consisting of $C_1$–$C_{10}$ alkyl, hydroxyalkyl, or cycloalkyl esters of acrylic acid and $C_1$–$C_{10}$ alkyl, hydroxyalkyl, or cycloalkyl esters of methacrylic acid, wherein the total weight percentage of copolymerized units of chloroprene and copolymerized units of said ester monomer or monomers is at least 90%, said second chloroprene polymer having been prepared by free radical emulsion polymerization to a conversion of at least 90% in the presence of a mercaptan, dialkylxanthogen disulfide, or dialkoxyxanthogen disulfide modifier; and wherein the weight of the first chloroprene polymer is 25–95% of the total weight of the first and second chloroprene polymers present in the dispersion and wherein the solids content of the dispersion is from 40–60 weight percent.

DETAILED DESCRIPTION OF THE INVENTION

The compositions of the present invention are especially useful as components of adhesive formulations and comprise blends of a) chloroprene homopolymers or copolymers with b) chloroprene/acrylate or chloroprene/methacrylate graft copolymers.

The polychloroprene homopolymers or copolymers which constitute the first blend component are mercaptan-modified, dialkylxanthogen disulfide-modified, or dialkoxyxanthogen disulfide modified chloroprene polymers. The copolymers are composed of at least 75 weight percent copolymerized chloroprene units and may be chloroprene dipolymers, terpolymers, or higher copolymers. The comonomers may be selected from the group consisting of 2,3-dichloro1,3-butadiene and monoethylenically unsaturated vinyl monomer containing from 3 to 10 carbon atoms, the preferred vinyl monomers being acrylonitrile, methacrylonitrile, lower alkyl acrylates, lower alkyl methacrylates, acrylamides, methacrylamides, lower alkyl maleates and fumarates, acrylic acid, methacrylic acid, fumaric acid, and maleic acid. Dipolymers of chloroprene and 2,3-dichloro-1,3-butadiene are preferred and, most preferably, the dipolymers contain 7–16 weight percent 2,3- dichloro-1,3-butadiene units and 84–93 weight percent chloroprene units. Examples of terpolymers suitable for use as the first component include chloroprene/2,3-dichloro- 1,3-butadiene/methacrylic acid copolymers, chloroprene/-butadiene/2,3-dichloro- 1,3-butadiene copolymers, chloroprene/acrylonitrile/methacrylic acid copolymers, and chloroprene/butadiene/methacrylic acid copolymers.

The chloroprene homopolymers, dipolymers, and higher copolymers are prepared by free radical emulsion polymerization to a conversion of at least 60% in the presence of 0.01–0.5 parts per hundred parts monomers of a mercaptan, dialkylxanthogen disulfide or dialkoxyxanthogen disulfide chain transfer agent. This insures that the gel content of the polymers is not excessive. Adhesives prepared from chloroprene polymers having high gel contents are deficient in quick grab. Generally, gel contents of less than 25 wt. % are desirable. Conversions of 70–95% are preferred in order to achieve as high a level of polymer solids in the dispersion as possible. Polymerization temperatures may range from 10–60° C. but, preferably, 10–25° C. is used because polymerization at higher temperatures leads to polymers with poor color stability. These polymers can be prepared by methods well-known in the art. Preparative details are disclosed, for example, in Encyclopedia of Polymer Science and Engineering, John Wiley and Sons, Volume 3, Second Edition, pages 441–462 (1985) and, more specifically, in U.S. Pat. Nos. 2,494,087; 2,567,117; 2,576,009; 3,655,827; and 3,686,156.

The chloroprene/acrylate and chloroprene/methacrylate graff copolymers which constitute the second component of the compositions of the present invention are also mercaptan-modified or xanthogen disulfide-modified polymers. The polymers are prepared by copolymerization of chloroprene and at least one $C_1$–$C_{10}$ alkyl, hydroxyalkyl, or cycloalkyl ester of acrylic or methacrylic acid to conversions of at least 90%, preferably 99%. By $C_1$–$C_{10}$ alkyl, hydroxyalkyl, or cycloalkyl esters of acrylic or methacrylic acid is meant that the alkyl, hydroxyalkyl, or cycloalkyl group of the ester moiety contains one to ten carbon atoms. Typical ester comonomers include methyl acrylate, ethyl acrylate, butyl acrylate, 2-ethylhexyl acrylate, hydroxyethyl methacrylate, tetrahydrofurfuryl methacrylate, cyclohexyl methacrylate, isobornyl methacrylate, methyl methacrylate, ethyl methacrylate, and butyl methacrylate. Methyl methacrylate, ethyl methacrylate, and butyl methacrylate are preferred. The copolymers, wherein the polymer backbone is composed of 70–95 weight percent copolymerized units of chloroprene and 5–30 weight percent copolymerized units of $C_1$–$C_{10}$ alkyl esters of acrylic or methacrylic acid, provide effective adhesive base resins when blended with the above-described chloroprene homopolymer and copolymer components of the composition. It is preferred that the copolymer contain 10–25 weight percent copolymerized acrylic or methacrylic ester units because long term bond strength and latex stability are enhanced in such compositions. Optionally, the chloroprene/acrylate or chloroprene/methacrylate copolymers may also contain up to 10 weight percent copolymerized units of other vinyl monomers. Preferably, however, the copolymers are dipolymers. Examples of suitable vinyl monomers include 2,3-dichloro1,3-butadiene, 1,3-butadiene, methacrylic acid, acrylonitrile, and styrene. In addition to copolymerizing with chloroprene to form the polymer backbone, the acrylate or methacrylate monomers also graft copolymerize onto the copolymer backbone. Generally, about one half of the acrylate or methacrylate monomer units are present in the grafted sidechains.

The graft copolymers may be prepared by free radical polymerization of an aqueous emulsion of chloroprene, the acrylate ester or methacrylate ester comonomer, and any additional vinyl monomer in the presence of an anionic surfactant and a molecular weight regulator, i.e. a modifying agent or chain transfer agent.

The graft copolymerization is effectively accomplished when the anionic surfactant is one wherein the cation has one of the following structures: triethanolammonium, tri(2-propanol)ammonium, diethanolammonium and $C_1$–$C_3$ alkyldiethanolammonium. The anions of the surfactants are preferably derived from strong acids, such as organic sulfonic acids, and sulfate esters. Preferred surfactants are triethanolammonium dodecylbenzenesulfonate, and diethanolammonium dodecylbenzenesulfonate.

The reaction is carried out in the presence of a polymerization initiator, preferably based on a redox pair. Typical redox pairs include sodium sulfite/potassium persulfate, ammonium persulfate/sodium bisulfite, and potassium persulfate/sodium metabisulfite.

Polymerization is performed in an inert atmosphere, free of oxygen, generally at atmospheric pressure and at a temperature of 10–60° C., to a conversion of at least 90%, preferably gr reaction temperature is preferably maintained between 10° C. and 20° C. until a conversion of at least 70% is reached. Then the temperature is raised to 45–55° C. Polymerization using this method results in a colorless product.

The modifier which is present prevents formation of copolymers of very high molecular weight which tend to be crosslinked and insoluble, i.e. gel. The alkyl mercaptan modifiers suitable for use in the preparation of the copolymers generally have chain lengths of about from 4–20 carbon atoms. The alkyl radicals may be straight-chained or branched, and they may be primary, secondary, or tertiary. It is preferred that the alkyl radicals have about 8–16 carbon atoms. Examples include octyl mercaptan, dodecyl mercaptan, tert-dodecyl mercaptan, tridecyl mercaptan, and mixtures of mercaptans derived from coconut oil. Dodecyl mercaptan is particularly preferred. The dialkylxanthogen disulfide chain transfer agents used for modifying the chloroprene copolymer can be represented by the formula

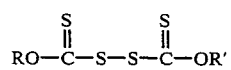

wherein R and R' are alkyl radicals having one to eight carbon atoms. Examples of suitable alkyl radicals are methyl, ethyl, propyl, isopropyl, and the various isomeric butyl, amyl, hexyl, heptyl, and octyl radicals. Preferred dialkylxanthogen disulfides are those in which each alkyl radical has 1 to 4 carbon atoms. Diisopropylxanthogen disulfide is particularly preferred because it has a lower toxicity than other dialkylxanthogen disulfides while maintaining good efficiency. Dialkoxyxanthogen disulfide modifiers may also be employed. These compounds are compositions of the formula

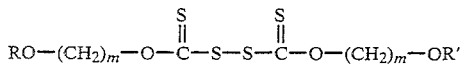

wherein R and R' are independently hydrogen, alkyl radicals having 1-8 carbon atoms, or an oxygen-containing heterocyclic ring system having from 5 to 6 ring members and m is 2 to 6. Examples of suitable alkyl radicals are methyl, ethyl, butyl, and hexyl. A preferred heterocyclic R group is 5-ethyl-1,3-dioxan-5-yl-methyl. Generally the modifier content of the polymer is from 0.05-0.8 weight percent, preferably 0.1-0.25 wt. %. At least 0.05 parts, preferably 0.1-0.25 parts, chain transfer agent per 100 parts monomer is used during the polymerization in order to control polymer viscosity and gel content. The maximum amount of chain transfer agent that may be used to produce polymers of the desired viscosity is 0.8 parts per 100 parts of monomer.

In preparing the graft copolymer component of the present invention all the acrylic or methacrylic monomer is added with the chloroprene monomer at the beginning of the reaction. Generally, about 5 to 30 parts per hundred monomer of the acrylate of methacrylate monomer is used. Copolymerization takes place until the chloroprene monomer is depleted. Then excess acrylic or methacrylic monomer gaffs onto the copolymer backbone.

The polymeric blend components of the present invention may be isolated from the polymerization emulsion in which they are prepared after short stopping the polymerization with an agent such as phenothiazine, 4-tert-butylcatechol, 4,4'-thiobis(6-tert-butyl-m-cresol) or N,N'-diethylhydroxylamine. Unreacted monomer is then removed and the products may be isolated, generally on a freeze roll. If the compositions are to be used as latex adhesive base resins, however, it is more practical not to isolate the blend components, but to mix the latexes. This may be done prior to stripping of unreacted monomer or following the stripping process. The solid polymers or latexes should be mixed in proportions such that the final blend or latex contains 25-95 parts of the chloroprene homopolymer or copolymer per 100 parts of the total weight of polymeric blend components. That is, the chloroprene homopolymer or copolymer (Component A) is 25-95% of the total weight of Component A and the chloroprene/acrylate or chloroprene/methacrylate gaff copolymer (Component B). It is preferred that Component A is present at levels of 30-70 wt. %. If Component A is present in quantities below 25 wt. %, quick gab (the immediate adhesion between the adhesive and substrate layers) of adhesives prepared from the blend is poor. If, however, the level of Component B is below 5% of the total weight of the blend, long term adhesion is poor.

The blends of the present invention may be used to prepare typical elastomeric products such as belts, hoses, engine mounts, and CVJ boots. However, they are especially suited for preparation of adhesives, most particularly latex adhesives wherein substantially no organic solvent carriers are present. Such adhesive formulations are aqueous dispersions which generally contain polymer base resins and additives such as hydrocarbon tackifier resins, zinc oxide, antioxidants, thickeners, and other components known to those skilled in the art. Preferably a latex blend of the present invention, having a solids content of 40-60 weight percent, is used in formulating the adhesives. Latex adhesives in which the blends of the present invention are present as polymeric base resins exhibit excellent adhesion to polyvinyl chloride, SBR, and canvas.

EXAMPLES

The invention is further illustrated by the following embodiments wherein all parts are by weight unless otherwise specified.

Test Methods

Test specimens were prepared as follows. For each test specimen, two 1×6 inch (2.5×15.2cm) strips of substrate, coated with adhesive, were placed in an oven at 70° C. for 25 seconds. The two coated substrates were placed in an air bladder press in such a way that the coated sides of the substrates were in contact. The bladder was inflated to 30 psi (0.21MPa) for 25 seconds and the sample was then removed from the press. Adhesive properties of the specimens were determined according to the following methods.

Peel Strength- ASTM D413.

Quick Grab- The bonded assembly was tested one minute after bonding. A bond strength of 2-5 pli (0.35-0.88kN/m) is desirable. A lower bond strength will not hold the substrates together; a higher bond strength will not allow the substrates to be repositioned.

Long Term Bond Strength- The bonded assembly was tested seven days after bonding according to ASTM D413.

Example 1

A copolymer of chloroprene and 2,3-dichloro- 1,3-butadiene was prepared by emulsion polymerization. Eighty parts chloroprene, 20 parts 2,3-dichloro-1,3-butadiene, 1.6 parts disproportionated tall oil rosin, and 0.1 parts n-dodecyl mercaptan were emulsified with 57 parts water, 1.15 parts potassium hydroxide, 0.9 parts of the potassium salt of a condensate of naphthalene sulfonic acid and formaldehyde, 0.15 parts dimerized unsaturated fatty acid, 0.2 parts dextrose, 0.2 parts potassium sulfite, and 0.02 parts sodium 2-anthraquinone sulfonate. The polymerization was initiated at 20° C. using a 4% potassium persulfate solution. After initiation the polymerization temperature was maintained at 15° C. for the duration of the reaction. When 80% of the monomer had polymerized, the polymerization was stopped by addition of phenothiazine and the unreacted monomers were removed from the is emulsion by steam stripping. The solids content of the emulsion after stripping was 55.3%.

A chloroprene/methyl methacrylate graft copolymer was prepared as follows. A mixture of 80 parts chloroprene, 20 parts methyl methacrylate, and 0.2 parts n-dodecylmercaptan was emulsified with 110 parts water, 5 parts 60% triethanolammonium dodecylbenzene sulfonate, 1 part nonyl phenol condensed with 10 moles of ethylene oxide, 0.3 parts sodium sulfite, and 0.24 parts potassium hydroxide. Polymerization was initiated at 15° C. by addition of potassium persulfate and the temperature was maintained until the specific gravity of the emulsion reached 1.060 B which represented a conversion of 75%. The temperature of the emulsion was then raised to 48° C. and polymerization continued until no further specific gravity increase was observed. The conversion was greater than 99% and a shortstopping agent, phenothiazine, was added. The solids content of the emulsion was 47.0%.

A 128g sample of the chloroprene/methyl methacrylate graft copolymer emulsion was added to 72g of the chloroprene/2,3-dichloro1,3-butadiene emulsion and the blend was stirred well.

A sample of the emulsion blend was coated on 1×6"(2.5×15.2cm) plasticized polyvinyl chloride and Neolite strips. First one coat was brushed on and the substrates were allowed to dry for 20 minutes. Then a second coat was applied and allowed to dry for an additional 20 minutes. An adhesive specimen was formed by bonding a plasticized polyvinyl chloride strip to a Neolite strip. The quick grab of the adhesive was tested and found to be 2 pli (0.35kN/m) The long term bond strength of the bonded assembly was 15 pli (2.6kN/m) after 7 days.

Example 2

A chloroprene homopolymer was prepared by emulsion polymerization. A solution of 100 parts chloroprene, 1.6 parts disproportionated tall oil rosin, and 0.25 parts dodecyl mercaptan was emulsified with a solution of 57 parts water, 1.15 parts potassium hydroxide, 0.9 parts of the potassium salt of a condensate of naphthalene sulfonic acid and formaldehyde, 0.15 parts dimerized fatty acid, 0.2 parts dextrose, 0.2 parts potassium sulfite, and 0.02 parts sodium 2anthraquinone sulfonate. The emulsion was polymerized as in Example 1 with a 4% potassium persulfate solution. When 80% of the monomer had polymerized, the polymerization was stopped by addition of phenothiazine and the unreacted monomer was removed by steam stripping. The solids content of the emulsion after stripping was 52.2%.

A 128g sample of the chloroprene/methyl methacrylate graff copolymer emulsion described in Example 1 was added to 77g of the polychloroprene emulsion. A sample of the blended emulsion was applied to two plasticized polyvinyl chloride strips and bonded. Quick grab was 3 pli (0.53kN/m), and long term bond strength after 7 days was 10 pli ( 1 .SkN/m).

Example 3

A latex containing a copolymer of chloroprene and 2,3-dichloro-1,3-butadiene was prepared by emulsion polymerization using the same procedure as was used to prepare the chloroprene/2,3-dichloro1,3-butadiene copolymer latex of Example 1 except that 0.175 parts of dodecyl mercaptan was used in place of 0.1 part. Monomer conversion was 78.5% and the solids content of the latex after stripping was 59.4%.

A graft copolymer of chloroprene and ethyl methacrylate was prepared using the procedure described in Example 1 for preparation of the chloroprene/methyl methacrylate graft copolymer except that 20 parts of ethyl methacrylate was used in place of the methyl methacrylate. Polymerization proceeded at 15° C. until a conversion of approximately 78% was reached, whereupon the temperature was raised to 48° C. Polymerization was continued until the conversion was greater than 99%. The solids content of the latex was 47.2%.

A 116g sample of the chloroprene/ethyl methacrylate graft copolymer emulsion was added to 75.7g of the chloroprene/2,3-dichloro-3-butadiene emulsion and the blend was stirred well. The emulsion blend was used to prepare test specimens as described in Example 1. Quick grab was 3 pli (0.53kN/m), and long term bond strength after 7 days was 2 pli (0.35kN/m).

It is claimed:

1. A polyehloroprene composition especially adapted for use in formulating adhesives which comprises an aqueous dispersion of
   a) a first chloroprene polymer having a gel content of less than 25 percent by weight which is (i) a polychloroprene homopolymer or (ii) a copolymer of chloroprene and at least one other comonomer selected from the group consisting of 2,3-dichloro-1,3-butadiene and monoethylenically unsaturated vinyl monomers containing from 3 to 10 carbon atoms, wherein at least 75 weight percent of the copolymerized units are chloroprene units, said first chloroprene polymer having been prepared by free radical emulsion polymerization at a polymerization temperature of 10–25° C. to a conversion of at least 60% in the presence of mercaptan, dialkylxanthogen disulfide, or dialkoxyxanthogen disulfide modifier; and
   b) a second chloroprene polymer which is a graff copolymer comprising 70–95 percent by weight copolymerized units of chloroprene and 5–30 percent by weight copolymerized units of at least one ester monomer selected from the group consisting of $C_1$–$C_{10}$ alkyl, hydroxyalkyl, or cycloalkyl esters of acrylic acid and $C_1$–$C_{10}$ alkyl, hydroxyalkyl, or cycloalkyl esters of methacrylic acid, wherein the total weight percentage of copolymerized units of chloroprene and copolymerized units of said ester monomer or monomers is at least 90%, said second chloroprene polymer having been prepared by free radical emulsion polymerization to a conversion of at least 90% in the presence of a mercaptan, dialkylxanthogen disulfide, or dialkoxyxanthogen disulfide modifier; wherein the weight of the first chloroprene polymer is 25–95% of the total weight of the first and second chloroprene polymers and wherein the solids content of the dispersion is from 40–60 weight percent.

2. The composition of claim 1 wherein the first chloroprene polymer is a dipolymer of chloroprene and 2,3-dichloro-1,3-butadiene.

3. The composition of claim 2 wherein the dipolymer is composed of 84–93 weight percent copolymerized chloroprene units and 7–16 weight percent copolymerized units of 2,3,-dichloro- 1,3-butadiene.

4. The composition of claim 1 wherein the first chloroprene polymer is prepared by free radical emulsion polymerization to a conversion of 70–95%.

5. The composition of claim 1 wherein the ester monomer of component b) is a $C_1$–$C_{10}$ alkyl ester of acrylic acid or a $C_1$–$C_{10}$ alkyl ester of methacrylic acid.

6. The composition of claim 5 wherein the percentage of copolymerized units of the $C_1$–$C_{10}$ alkyl ester of acrylic acid or $C_1$–$C_{10}$ alkyl ester of methacrylic acid is 10–25 weight percent.

7. The composition of claim 1 wherein the second chloroprene copolymer is prepared by polymerization at an initial temperature of 10–20° C. until a conversion of at least 70% is obtained and then raising the polymerization to a temperature of 45–55° C.

8. The composition of claim 1 wherein the second chloroprene copolymer is prepared by free radical polymerization to a conversion of at least 99%.

9. The composition of claim 1 wherein the ester monomer of component b) is methyl methacrylate.

10. The composition of claim 1 wherein the ester monomer of component b) is ethyl methacrylate.

* * * * *